March 30, 1965 H. G. MEEKER ETAL 3,175,282
METHOD FOR LOWERING AND RAISING BIMETALLIC CABLE
Filed Nov. 13, 1962 2 Sheets-Sheet 1
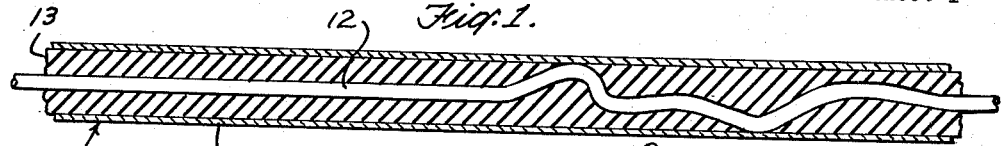
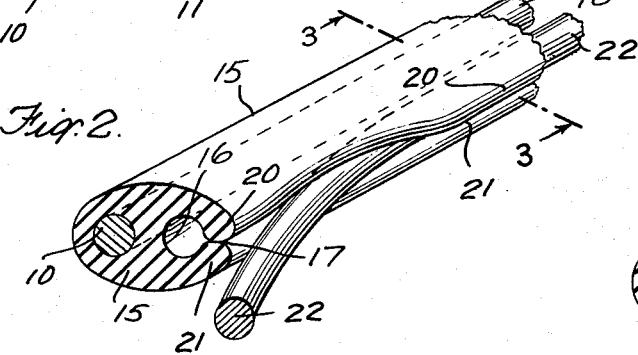
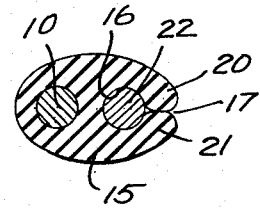
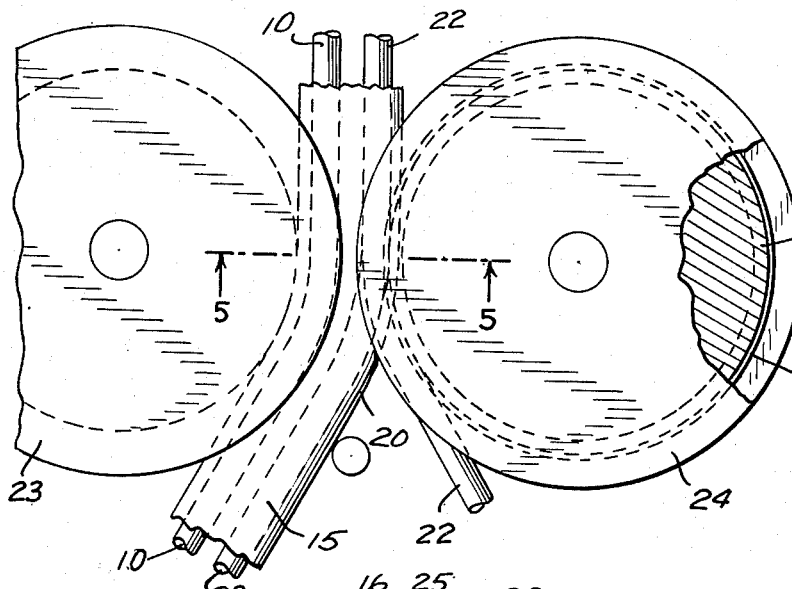
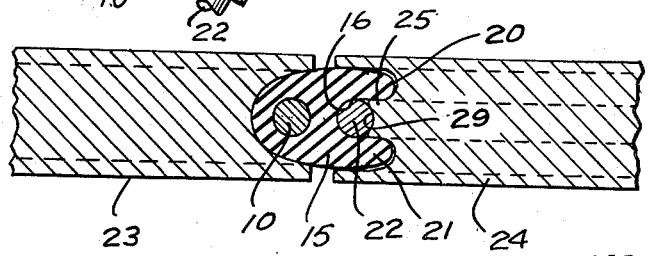
INVENTORS
HORACE G. MEEKER
CARL G. WENNERSTROM
BY
*Borst & Borst*
ATTORNEYS INVENTORS
HORACE G. MEEKER
CARL G. WENNERSTROM
BY
Borst & Borst
ATTORNEYS United States Patent Office 3,175,282
Patented Mar. 30, 1965

3,175,282
METHOD FOR LOWERING AND RAISING
BIMETALLIC CABLE
Horace G. Meeker, 19 Hamilton Road, Glen Ridge, N.J., and Carl G. Wennerstrom, 3016 Park Place, Evanston, Ill.
Filed Nov. 13, 1962, Ser. No. 236,803
1 Claim. (Cl. 29—404)

The present invention relates to a method for mating a pair of elements and in particular a method for securing one element to another element in such a manner that the one is adapted to serve entirely to support the other.

The instant process has special utility in oceanographic research in the performance of which it is required to pay out from a vessel a cable which is employed as an electrical conductor to convey visual and coded information relating to phenomena concerning the ocean medium and the ocean bottom such as the latter's composition and topography. Ordinarily the cable is of the coaxial type which may be lowered into the ocean as much as 20,000 feet or more in length to the terminal portion of which is secured a load which consists of electrical measuring instruments and electronic equipment such as television apparatus. It may be imagined that the weight of the coaxial cable and consequent stress due to tension are substantial. Because a coaxial cable is bimetallic normally comprising a copper core and concentric steel sleeve insulated therefrom, there will be unequal stress distortion between the core and the surrounding sleeve. In fact the copper may be stretched beyond its elastic limit so that when the stress is removed it will not return to its original length as will the steel component of the cable. The resulting "ripple" may cause the copper to cut through the insulation and ground it to the steel armor thus destroying the usefulness of the cable. Accordingly, there is seen a need for supporting the cable in such a manner as to eliminate stress thereon in order to prevent destruction of the cable after use in this manner.

To this end, the invention contemplates a process for dropping a coaxial cable to the ocean bottom by continuously combining therewith as it is paid out a hoisting cable which will effectively support the entire weight of the electrical cable and its instrumental load. In effect, the invention encompasses the joining of an unstressed member with a prestressed member so that the former will not be subject to distortion resulting from stress.

One object of the invention is to provide a method for assembling and securing a suspended coaxial cable to a supporting cable.

Other objects and advantages of the invention may be appreciated on reading the following description which is taken in conjunction with the accompanying drawings in which FIG. 1 illustrates a coaxial cable the copper core of which has been made to ripple after the cable has been relieved of stress under tension.

FIG. 2 is an isometric on an enlarged scale showing a hoisting cable partially joined to a coaxial cable.

FIG. 3 is a cross section taken on line 3—3 of FIG. 2.

FIG. 4 discloses a part of sheaves which are used to effect the joining of the coaxial cable to a hoisting cable.

FIG. 5 is an enlarged partial section taken on line 5—5 of FIG. 4.

Figure 6:
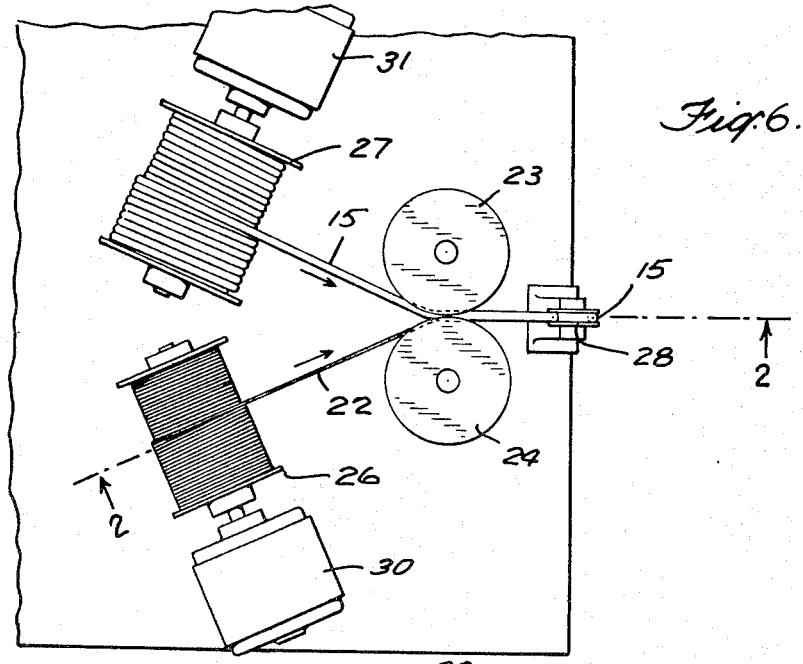
Figure 7:
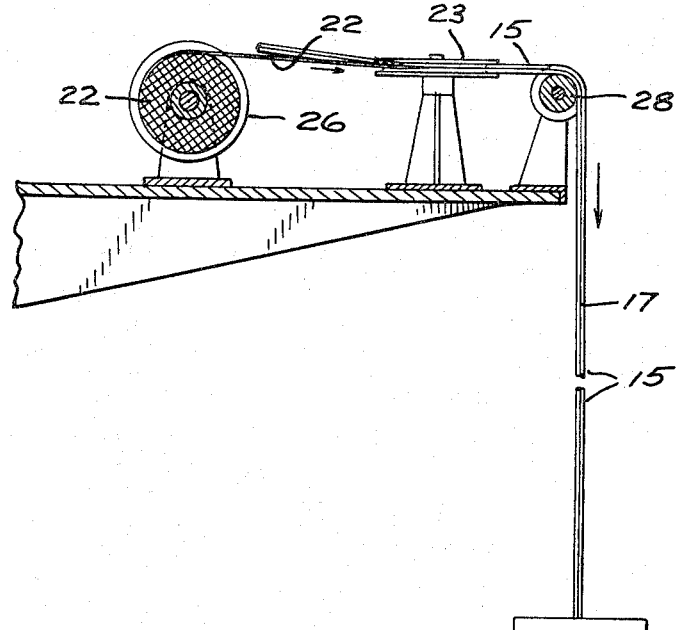

FIG. 6 is a plan illustrating the apparatus for lowering and raising from the side of a ship a composite cable which includes a coaxial cable, and FIG. 7 is an elevation showing the same apparatus and in addition the instrumental load secured to the coaxial cable.

As shown in FIG. 1, a coaxial cable 10 consists of an outer steel sleeve 11 and a copper wire core 12, the sleeve and the core being electrically separated from each other by means of insulation 13. As mentioned above, the copper core having a different elastic limit from that of the steel armor 11, the former will be caused to ripple if it is streached beyond its limit. Assuming the load is not sufficient to stretch the steel sleeve 11 beyond its elastic limit, the copper core will ripple when the stress due to the load is relieved which causes the copper to cut through the insulation 13 and contact the steel as shown in FIG. 1. It is to prevent shorting due to the copper to steel contact within the coaxial cable after the latter has been reeled in that the present invention addresses itself.

As shown in FIG. 2, a coaxial cable 10 is encased in a plastic or rubber sheath 15 which has a longitudinal slot 16 formed in its surface. The slot 16 has a mouth 17 formed by normally closed lips 20 and 21.

Means are provided to cause a steel hoisting cable 22 to pass by the flexible lips of the mouth 17 and into the slot so that the cable 22 becomes joined or mated to the coaxial cable 10 by means of the rubber sheath 15. Such means may comprise the use of a pair of sheaves 23 and 24 which are rotatively mounted proximate each other so that their outer circumferences are closely spaced at their nearest point. As shown in FIGS. 4 and 5 the sheaves comprise grooved pulley wheels with the sheave 24 having a raised portion 25 centrally disposed within its peripheral groove. This peripheral groove is wider than the corresponding groove formed in the sheave 23 so as to provide sufficient space for the opening of the slot 16 in the sheath 15 which occurs as the hoisting cable is forced through the mouth of the slot. The surface of the raised portion 25 is provided with a concavity 29, which conforms to the curvature of the hoisting cable 22.

The steel hoisting cable 22 and the sheathed coaxial cable 11 are wound on separate winches or drums 26 and 27 which are separately driven by hoisting motors 30 and 31 respectively. The two elements are unwound from their respective winches and passed together into the opening formed by the sheaves 23 and 24 from whence the mated cable is passed over a sheave 28 which may be located on the extreme edge of the ship's deck as shown in FIGS. 6 and 7. There is secured to the coaxial cable 11 and steel hoisting cable 22 a pay-load 32 which consists of electrical instruments which are adapted to measure or indicate ocean phenomena.

It must be recognized that the joining of the steel hoisting cable to the coaxial cable by means of its encasing sheath is effected continuously along the latter's entire length being initially joined at the juncture of the coaxial cable and its attached load. Accordingly, each unit length of coaxial cable is supported by a corresponding length of hoisting cable which is under stress and stretched according to its distance from the load. The stress on the hoisting cable results from its own weight and in addition the weight of the supported coaxial cable and the pay-load secured thereto. Because each unit length of the coaxial cable is thus supported continuously along its entire length it will be completely unstressed regardless of its length when in use while the hoisting cable is subjected to a continuously varying stress along its full length. Hence, it would seem that the instant joining process involves the mating of a supporting stressed member to a supported unstressed member. Because the electrical cable is unstressed it will not, of course, be subjected to stretching and effectively precludes, therefore, any possibility of core rippling. The hoisting cable is prestressed at the point of juncture with the electrical cable and will not undergo further stress or stretching thereafter. When the combined cables are hoisted aboard the ship the two cables are separated as they pass through the sheaves 23 and 24 and are wound separately on their respective winches.

It may be appreciated that apparatus may be employed to effect the joining of the electrical and hoisting cables other than that specifically described hereinabove and other modifications may be made by persons skilled in the art without departing from the principle and scope of invention as defined in the appended claim.

What is claimed is:

A method of assembling and securing an elongated suspended coaxial cable having a slot with normally closed flexible lips to a supporting cable under the operating conditions of supporting a desired load, comprising progressively opening said flexible lips of said slot and progressively assembling and securing an elongated supporting cable within said slot to thereby provide an unstressed condition in said suspended coaxial cable as the supporting cable is progressively extended in length, each unit length of the supporting cable on said assembling and securing being prestressed to the maximum stress to which it is to be subjected due to its own weight and the weight of the depending length of the coaxial cable, and subsequently, progressively opening said flexible lips and progressively disassembling said supporting cable and said coaxial cable.

References Cited by the Examiner

UNITED STATES PATENTS

| | | | |
|---|---|---|---|
| 2,355,832 | 8/44 | Wagner | 29—203 |
| 2,355,833 | 8/44 | Bertalan | 29—203 |
| 2,677,528 | 5/54 | Dahl | 254—137 |
| 2,695,445 | 11/54 | Johnson et al. | 29—417 |
| 2,795,641 | 6/57 | Rowell | 174—135 |
| 2,809,421 | 10/57 | Dowse et al. | 29—200 |
| 2,961,759 | 11/60 | Weissfloch | 29—452 |
| 2,984,455 | 5/61 | Fischer | 254—172 |
| 3,017,688 | 1/62 | Cummings et al. | 29—203 X |
| 3,032,868 | 5/62 | Billner | 29—452 |
| 3,033,916 | 5/62 | Scofield | 174—117 |

WHITMORE A. WILTZ, *Primary Examiner.*
SAMUEL F. COLEMAN, THOMAS H. EAGER, *Examiners.*